United States Patent [19]

Vogel

[11] 4,126,352
[45] Nov. 21, 1978

[54] SUNROOF

[75] Inventor: Wolfgang Vogel, Stockdorf, Germany

[73] Assignee: Webasto-Werk W. Baier GmbH & Co., Germany

[21] Appl. No.: 783,553

[22] Filed: Apr. 1, 1977

[30] Foreign Application Priority Data

Apr. 8, 1976 [DE] Fed. Rep. of Germany ....... 2615276

[51] Int. Cl.$^2$ ............................................... B60J 7/08
[52] U.S. Cl. .................................. 296/137 B; 74/89.15
[58] Field of Search ........... 296/137 B, 137 F, 137 G; 49/339, 341, 343, 78, 105 X; 74/89.15

[56] References Cited

U.S. PATENT DOCUMENTS

| 2,186,353 | 1/1940 | Wheeler | 74/89.15 |
| 3,955,848 | 5/1976 | Lutz | 296/137 B |
| 3,979,148 | 9/1976 | Martin | 296/137 B |

Primary Examiner—Robert R. Song
Attorney, Agent, or Firm—Craig & Antonelli

[57] ABSTRACT

A sunroof arrangement is provided which has a releasable sunroof opening cover member which can be moved between a closed position and a tilted position with the rear portion thereof raised above the adjacent vehicle roof panel structure. In order to minimize the space occupied by the tilting structure for the cover member, the same includes a tilting lever pivotally connected by loss-motion pin and slot connections to both of the roof frame structure and the cover member. In addition, the tilting lever is moved by way of a threaded axle and threaded bushing engageable at a position intermediate the pivotal connections of the tilting lever to the cover member and vehicle frame. Spring loaded detachable detent pins are provided at a bracket carried by the cover member for releasably engaging the tilting member.

13 Claims, 5 Drawing Figures

SUNROOF

BACKGROUND AND SUMMARY OF THE INVENTION

The invention relates to vehicle body panel structure with an opening closable by a cover. Particularly preferred embodiments of the invention relate to a sunroof with a roof opening closable by a cover, said cover being attached in the vicinity of its forward edge by a releasable swivel connection to the roof frame about an axis extending crosswise to the length of the vehicle, said cover being swivelable with its rear edge extending upward out of the roof plane by means of a tilting device releasable from the cover and mounted between the roof frame and the cover.

In known sunroofs of this kind (see for example German Offenlegungsschrift No. 23 51 270), the tilting device occupies a relatively large amount of space, thereby reducing the head room of the passengers. The danger of injury is also increased by projecting parts. Finally, the known tilting devices, if they are to allow the maximum possible, continuously adjustable, tilting movement of the cover, are relatively complicated and therefore costly to manufacture.

An object of the invention is to provide a sunroof of the type described hereinabove, wherein the tilting device for the cover is designed so that is occupies the smallest possible amount of space and consists of a few parts, and can therefore be manufactured at less cost.

According to preferred embodiments of the invention, the tilting device is provided with a tilting lever pivotally mounted on the roof frame on one side and on the cover on the other, said lever being swivelable by a twist handle mounted on the roof frame, whereby at least one of the pivotal connections consists of an elongated hole and a pin meshing with the latter and whereby the pivotal connection of the lever with the cover is releasable.

In the tilting device according to preferred embodiments of the invention, the tilting lever is essentially parallel to the cover when the latter is closed, being disposed between the cover and the headlining, so that practically no additional room is required. In these embodiments, only the twist handle projects from the headlining. According to other embodiments of the invention, the handle is designed as a flat plate or so as to be foldable.

The connection between the twist handle and the tilting lever is preferably provided in such manner that the axle of the twist handle, rotatably mounted on the roof frame, is provided with an external thread, with a threaded bushing disposed thereon, said bushing being swivelably but nonrotatably connected with the tilting lever. A threaded bushing of this kind requires only a very small amount of space, especially if it extends through the tilting lever.

A special problem of sunroofs in which the cover can be removed completely consists in the fact that releasing the connection between the cover and the tilting device from inside the passenger compartment, with the cover either closed or tilted, must be reliably prevented, since an inadvertent release while the vehicle is in motion can lead to the cover flying off and causing serious accidents. This problem can be solved by simple means in the tilting device according to a particularly preferred arrangement of the invention by virtue of the fact that the tilting lever is forked at the end facing the cover, and holds a bracket between its legs, said bracket being provided with locking pins displaceable against spring force, said pins constituting the rotational axis of the lever on the cover and fitting releasably in corresponding holes in the legs of the lever, and by the fact that actuating levers are provided on the locking pins between the legs of the lever, said actuating levers being accessible only with the cover tilted and only from outside. With the cover either closed or tilted, the actuating levers are covered by the legs of the tilting lever to such an extent that they are inaccessible from the passenger compartment. This effect can be intensified according to the invention by providing the roof frame with an edge which extends upward, surrounds the tilting lever, and covers it at the sides.

In order to facilitate engaging the cover with the tilting device when the cover is lowered back into the roof opening, preferred embodiments of the invention provide that the inner surfaces of the legs of the tilting lever are provided with sloping surfaces facing the bracket, said sloping surfaces pushing the locking pins back as the cover is pulled in. The actuating levers then need not be actuated at all, it merely sufficing to move the cover downward with a slight pressure, whereby the locking pins are pushed back and automatically engage the holes in the legs of the lever. In order to prevent reliably any damage to the tilting device when the cover is lowered, it is advantageous to provide a surface on the underside of the tilting lever which rests against the roof frame when the lid is shut. The force exerted on the cover for engagement with the tilting lever will then be accepted by the roof frame.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
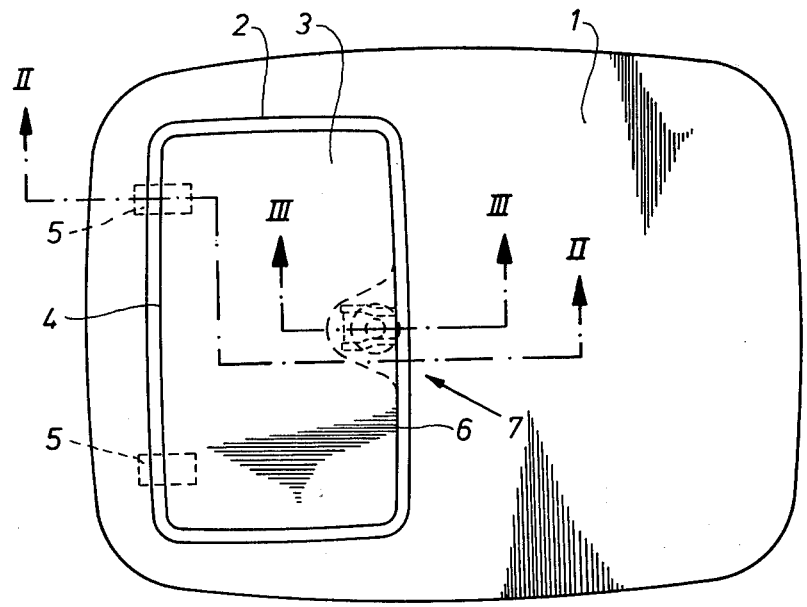
FIG. 1 is a top view of a sunroof with a cover constructed according to a preferred embodiment of the invention.

In FIG. 1, 1 represents the roof of a motor vehicle, especially an automobile, provided with a roof opening 2, closable by a cover 3. Cover 3 is provided along its forward edge 4 with projecting pin elements 5, which produce a releasable swiveling connection in a manner to be described hereinbelow. Cover 3 is also releasably connected to roof 1 by a tilting device 7 in the vicinity of its rear edge 6.

Figure 2:
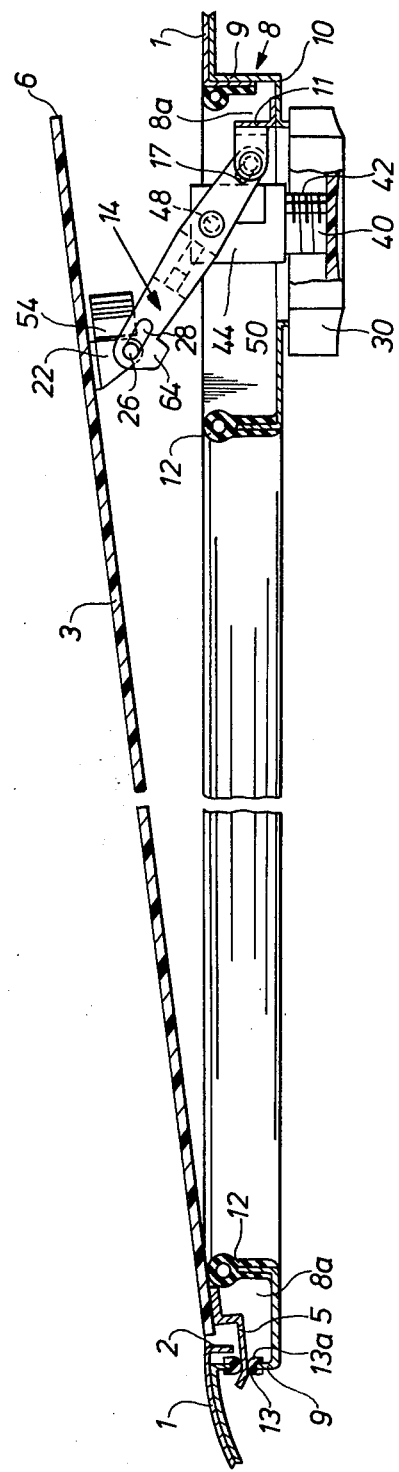
FIG. 2 is a sectional view along line II—II in FIG. 1, showing the cover in a tilted position.

As shown in FIG. 2, roof opening 2 is surrounded by a roof frame 8, the frame part 9 of said roof frame extending vertically downward from roof 1 with bottom part 10 and forming a rain gutter 8a with an edge 11 extending upward, a circumferential elastic gasket 12 being mounted on said rain gutter. Two horizontal slots 13 are provided in the forward frame part 9, said slots corresponding in length approximately to the width of pin elements 5 and surrounded by elastic O-rings 13a. Pin elements 5 are inserted in slots 13, as shown in FIG. 2, and form a hinge for cover 3. O-rings 13a prevent water from rain gutter 8a from entering the interior of the vehicle through slot 13.

Tilting device 7 is provided with a tilting lever 14, said lever being rotatably or pivotally mounted on the one hand by pins 16 in bracket 18 mounted on roof frame 8, and connected rotatably or pivotally on the other hand with cover 3. For this purpose, tilting lever 14 is forked at the end facing cover 3, and holds a bracket 22 mounted on cover 3 between its legs 20. Locking pins 26 displaceable laterally outward by springs 24, are disposed in bracket 22, said pins fitting into corresponding holes 28 in the legs 20 of tilting lever 14. These locking pins 26 form the axis of rotation of the swivel connection between tilting lever 14 and cover 3.

Figure 3:
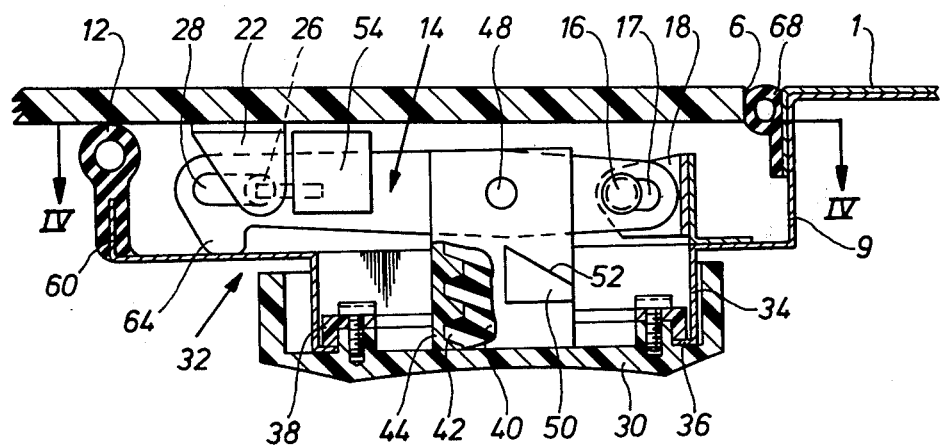
FIG. 3 is a sectional view along line III—III in FIG. 1, on an enlarged scale, showing the cover in its closed position.

In order to swivel tilting lever 14 and cover 3 therewith from the closed position shown in FIG. 3 to a tilted position shown in FIG. 2 and vice versa, a twist handle 30 is provided, said handle being rotatably mounted on a projection 32 of roof frame 8. For this purpose, projection 32 has a cylindrical extension 34 extending downward with an edge 36, said edge being turned inward, said edge forming a bearing surface for twist handle 30. A bearing element 38, screwed for example onto twist handle 30 from above, holds the twist handle against beaded edge 36. Twist handle 30 is provided with an axle 40 with an external thread 42, on which a threaded bushing 44 with an internal thread is disposed, said threaded bushing extending through an opening 46 in tilting lever 14 and being swivelably but nonrotatably connected with said lever by means of a pin 48. When twist handle 30 is rotated, threaded bushing 44 moves along axle 40 depending on the direction of rotation, upward or downward, and swivels tilting lever 14. In order to allow this swiveling movement to occur, holes 17 and 28 in legs 20 of tilting lever 14, which accept pins 16 and locking pins 26, are made in the form of elongated holes.

In order to provide an additional support for cover 3 and/or tilting lever 14 in the tilted position (FIG. 2), this being advantageous in view of the wind pressure which is imposed on the cover while the vehicle is in motion, a projection 50 is provided on each side of the threaded bushing, said projection having an upper sloping surface 52, said surface corresponding to the sloping position of tilting lever 14 in the tilted position, as shown in FIG. 2.

Figure 4:
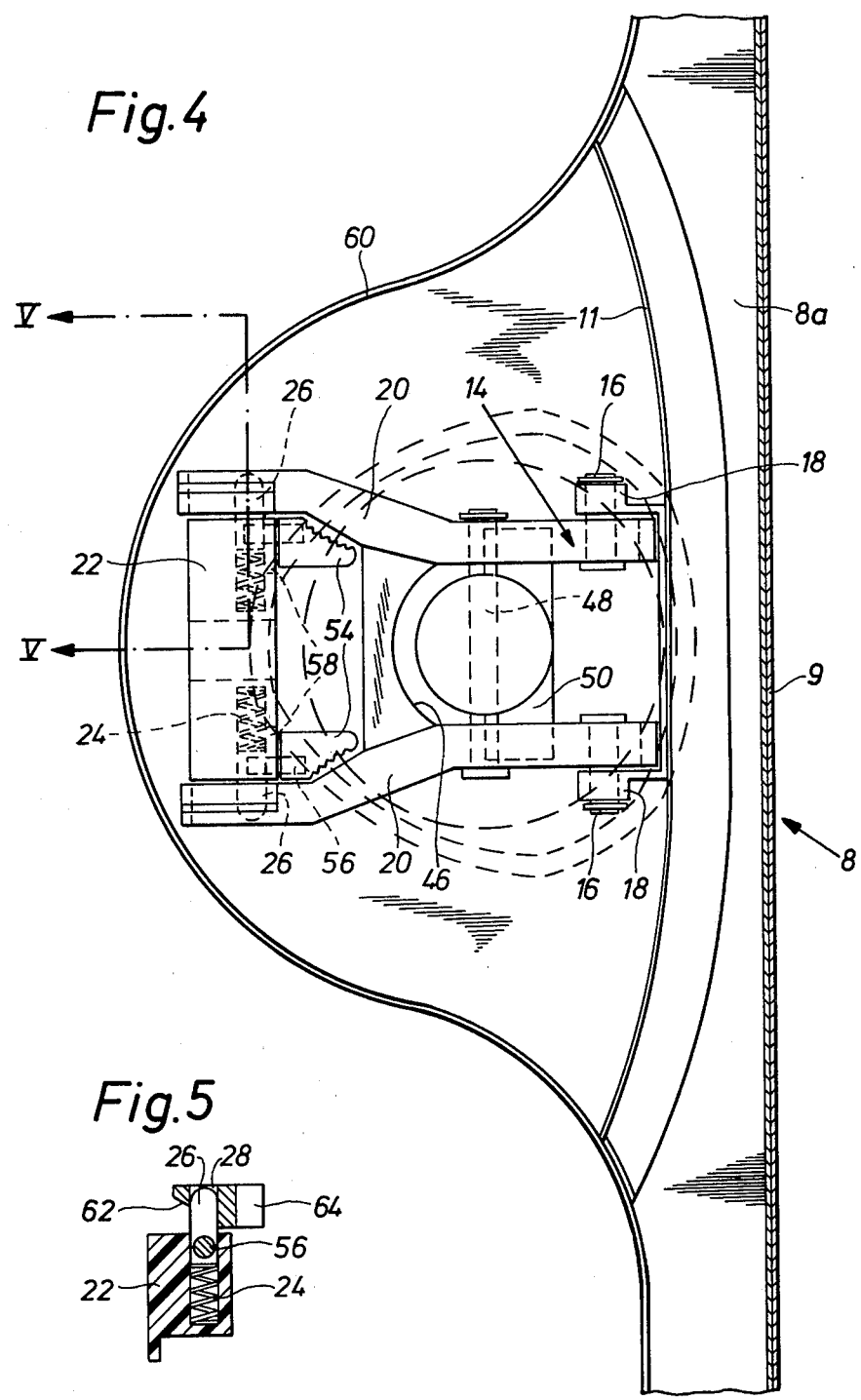
FIG. 4 is a sectional view along line IV—IV in FIG. 3.

In order to be able to release cover 3 from the tilting device, locking pins 26 are connected with actuating levers 54, by means of pins 56, said pins extending through elongated holes 58 in bracket 22. By squeezing actuating levers 54 together, locking pins 26 are disengaged from holes 28, so that cover 3 can be pulled out of slots 13 in the front part of the frame 9. As shown in FIG. 4, actuating levers 54 are disposed between the legs 20 of tilting lever 14. Therefore, when the cover is closed (FIG. 3) they are completely inaccessible, and are accessible only with great difficulty from the interior of the vehicle when the cover 3 is tilted (FIG. 2). This accessibility from inside is made even more difficult by the fact that projection 32 of roof frame 8 is provided with edge 60, extending upward, surrounding tilting lever 14, and covering it laterally. Actuating levers 54 are accessible only from outside and only with the roof tilted, as shown in FIG. 2. This reliably prevents the connection between cover 3 and tilting lever 14 from being released from inside the vehicle.

Figure 5:
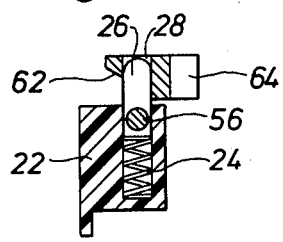
FIG. 5 is a sectional view along line V—V in FIG. 4.

In order to facilitate connection of cover 3 with tilting lever 14 when the cover is replaced in roof opening 2, the inner surfaces of legs 20 facing bracket 22 are provided with sloping surfaces 62 (FIG. 5), said surfaces automatically pushing locking pins 26 backward when cover 3 is installed. Therefore, it is not necessary to press actuating levers 54 together.

In order to reduce the stress on tilting lever 14 when cover 3 is installed, a projection 64 is provided on the underside of each leg 20, said projection supporting tilting lever 14 on projection 32 of roof frame 8 when said tilting lever is in the closed position, as shown in FIG. 3. In this manner, the forces exerted on cover 3 when locking pins 26 are snapped into corresponding holes 28 are accepted by roof frame 8.

Gasket 12 extends along the edge 60 of frame extension 32. It rests against the underside of closed cover 3 and forms a seal of esthetic design. In addition, the closed cover is prevented from rattling. A seal which surrounds roof opening 2 and cooperates with the edge of closed cover 3 is designated 68.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Movable cover apparatus for an opening in a vehicle panel member arrangement comprising:

a cover member, a releasable swivel connection for pivotally connecting a first edge portion of said cover member to adjacent vehicle frame structure, and a tilting device for tiltingly moving said cover member with respect to adjacent vehicle panel member structure, said tilting device including:

a tilting lever, first connecting means for pivotally connecting said tilting lever to said cover member, second connecting means for pivotally connecting said tilting lever to adjacent vehicle frame structure, and tilting means engageable with said tilting lever for applying tilting forces thereto, at least one of said first and second connecting means including a pin and elongated slot connection, said first connecting means including means for releasably connecting said tilting lever and said cover member to one another, wherein the tilting lever is forked at its end facing the cover member, wherein said cover member includes a bracket mounted thereon which is movable in the space between fork legs formed by said tilting lever, said bracket being provided with locking pins displaceable against spring force, said locking pins forming the axis of rotation of the tilting lever on the cover member and fitting releasably in corresponding holes in the legs of the tilting lever, and wherein actuating levers are mounted on the locking pins between the legs of the tilting lever, said actuating levers being accessible only with cover member tilted and only from outside the vehicle.

2. Apparatus according to claim 1, wherein inner surfaces of the legs facing the bracket are provided with sloping surfaces, said sloping surfaces serving for pushing the locking pins backward when the cover member is installed.

3. Apparatus according to claim 1, wherein the tilting lever is provided with abutment surface means which rest against fixed vehicle frame structure when the cover is in a closed position.

4. Movable cover apparatus for an opening in a vehicle panel member arrangement comprising:
a cover member,
a releasable swivel connection for pivotally connecting a first edge portion of said cover member to adjacent vehicle frame structure,
and a tilting device for tiltingly moving said cover member with respect to adjacent vehicle panel member structure,
said tilting device including:
a tilting lever,
first connecting means for pivotally connecting said tilting lever to said cover member,
second connecting means for pivotally connecting said tilting lever to adjacent vehicle frame structure,
and tilting means engageable with said tilting lever for applying tilting forces thereto,
at least one of said first and second connecting means including a pin and elongated slot connection,
said first connecting means including means for releasably connecting said tilting lever and said cover member to one another, wherein the tilting lever is provided with abutment surface means which rest against fixed vehicle frame structure when the cover is in a closed position.

5. Movable cover apparatus for an opening in a vehicle panel member arrangement comprising:
a cover member,
a releasable swivel connection for pivotally connecting a first edge portion of said cover member to adjacent vehicle frame structure,
and a tilting device for tiltingly moving said cover member with respect to adjacent vehicle panel member structure,
said tilting device including:
a tilting lever,
first connecting means for pivotally connecting said tilting lever to said cover member,
second connecting means for pivotally connecting said tilting lever to adjacent vehicle frame structure,
and tilting means engageable with said tilting lever for applying tilting forces thereto,
at least one of said first and second connecting means including a pin and elongated slot connection,
said first connecting means including means for releasably connecting said tilting lever and said cover member to one another, wherein said cover member is a cover member for a roof opening of a vehicle sunroof, and wherein said swivel connection is disposed in the vicinity of the forward edge of the vehicle sunroof, said swivel connection including means for accommodating pivotal movement of said cover member about an axis extending crosswise to the vehicle longitudinal axis, said tilting device including means for tilting the rear end of said cover member upward out of the roof plane, wherein said tilting means includes a twisting handle mounted on the vehicle frame structure, wherein the twist handle is rotatably mounted on the vehicle roof frame and is provided with an axle with an external thread on which a threaded bushing is disposed, said bushing being connected swivelably but nonrotatably with the tilting lever, and wherein both of said first and second connecting means include a respective pin and elongated slot connection.

6. Apparatus according to claim 5, wherein the threaded bushing is provided with extensions on opposite sides, the upper sides of said projections being made in the form of sloping surfaces upon which the tilting lever rests in the tilted position.

7. Movable cover apparatus for an opening in a vehicle panel member arrangement comprising:
a cover member,
a releasable swivel connection for pivotally connecting a first edge portion of said cover member to adjacent vehicle frame structure,
and a tilting device for tiltingly moving said cover member with respect to adjacent vehicle panel member structure,
said tilting device including:
a tilting lever,
first connecting means for pivotally connecting said tilting lever to said cover member,
second connecting means for pivotally connecting said tilting lever to adjacent vehicle frame structure,
and tilting means engageable with said tilting lever for applying tilting forces thereto,
at least one of said first and second connecting means including a pin and elongated slot connection,
said first connecting means including means for releasably connecting said tilting lever and said cover member to one another, wherein said cover member is a cover member for a roof opening of a vehicle sunroof, and wherein said swivel connection is disposed in the vicinity of the forward edge of the vehicle sunroof, said swivel connection including means for accommodating pivotal movement of said cover member about an axis extending crosswise to the vehicle longitudinal axis, said tilting device including means for tilting the rear end of said cover member upward out of the roof plane, wherein the vehicle roof frame is provided with an edge extending upward, surrounding the tilting lever, and covering the tilting lever in the lateral direction.

8. A tilting device for tiltingly movably supporting an edge portion of a cover member for an opening in a vehicle panel member arrangement; said tilting device comprising:
a tilting lever,
first connecting means for pivotally connecting said tilting lever to said cover member,
second connecting means for pivotally connecting said tilting lever to adjacent vehicle frame structure,
and tilting means engageable with said tilting lever for applying tilting forces thereto, at least one of said first and second connecting means including a pin and elongated slot connection,
said first connecting means including means for releasably connecting said tilting lever and said cover member, wherein the tilting lever is forked at its end facing the cover member, wherein said cover member includes a bracket mounted thereon which is movable in the space between fork legs formed by said tilting lever, said bracket being provided with locking pins displaceable against spring force, said locking pins displaceable against spring force, said locking pins forming the axis of rotation of the tilting lever on the cover member and fitting releasably in corresponding holes in the legs of the tilting lever, and wherein actuating levers are mounted on the locking pins between the legs of the tilting lever, said actuating levers being accessible only with cover member tilted and only from outside the vehicle.

9. A tilting device according to claim 8, wherein inner surfaces of the legs facing the bracket are provided with sloping surfaces, said sloping surfaces serving for pushing the locking pins backward when the cover member is installed.

10. A tilting device for tiltingly movably supporting an edge portion of a cover member for an opening in a vehicle panel member arrangement; said tilting device comprising:
a tilting lever,
first connecting means for pivotally connecting said tilting lever to said cover member,
second connecting means for pivotally connecting said tilting lever to adjacent vehicle frame structure,
and tilting means engageable with said tilting lever for applying tilting forces thereto, at least one of said first and second connecting means including a pin and elongated slot connection,
said first connecting means including means for releasably connecting said tilting lever and said cover member to one another, both of said first and second connecting means including a pin and elongated slot connection, wherein said tilting means includes:
a twist handle provided with an axle having an external thread,
a threaded bushing threadably disposed on said axle,
and bushing connecting means for swivelably and nonrotatably connecting said bushing with the tilting lever.

11. A tilting device for tiltingly movably supporting an edge portion of a cover member for an opening in a vehicle panel member arrangement; said tilting device comprising:
a tilting lever,
first connecting means for pivotally connecting said tilting lever to said cover member,
second connecting means for pivotally connecting said tilting lever to adjacent vehicle structure,
and tilting means engageable with said tilting lever for applying tilting forces thereto, at least one of said first and second connecting means including a pin and elongated slot connection,
said first connecting means including means for releasably connecting said tilting lever and said cover member to one another, both of said first and second connecting means including a pin and elongated slot connection, wherein said tilting means includes:
a twist handle provided with an axle having an external thread,
a threaded bushing threadably disposed on said axle,
bushing connecting means for swivelably and nonrotatably connecting said bushing with the tilting lever, and wherein said bushing connecting means is disposed on said tilting lever at a position intermediate said first and second connecting means.

12. A tilting device for tiltingly movably supporting an edge portion of a cover member for an opening in a vehicle panel member arrangement; said tilting device comprising:
a tilting lever,
first connecting means for pivotally connecting said tilting lever to said cover member,
second connecting means for pivotally connecting said tilting lever to adjacent vehicle frame structure,
and tilting means engageable with said tilting lever for applying tilting forces thereto, at least one of said first and second connecting means including a pin and elongated slot connection,
said first connecting means including means for releasably connecting said tilting lever and said cover member to one another, wherein said tilting means includes:
a twist handle provided with an axle having an external thread,
a threaded bushing threadably disposed on said axle,
bushing connecting means for swivelably and nonrotatably connecting said bushing with the tilting lever, and wherein said bushing connecting means is disposed on said tilting lever at a position intermediate said first and second connecting means, wherein the tilting lever is forked at its end facing the cover member, wherein said cover member includes a bracket mounted thereon which is movable in the space between fork legs formed by said tilting lever, said bracket being provided with locking pins displaceable against spring force, said locking pins forming the axis of rotation of the tilting lever on the cover member and fitting releasably in corresponding holes in the legs of the tilting lever, and wherein actuating levers are mounted on the locking pins between the legs of the tilting lever, said actuating levers being accessible only with cover member tilted and only from outside the vehicle.

13. A tilting device for tiltingly movably supporting an edge portion of a cover member for an opening in a vehicle panel member arrangement; said tilting device comprising:
a tilting lever,
first connecting means for pivotally connecting said tilting lever to said cover member,
second connecting means for pivotally connecting said tilting lever to adjacent vehicle frame structure, and tilting means engageable with said tilting lever for applying tilting forces thereto, at least one of said first and second connecting means including a pin and elongated slot connection,
said first connecting means including means for releasably connecting said tilting lever and said cover member to one another, wherein said tilting means includes:
a twist handle provided with an axle having an external thread,
a threaded bushing threadably disposed on said axle,
bushing connecting means for swivelably and nonrotatably connecting said bushing with the tilting lever, and wherein said bushing connecting means is disposed on said tilting lever at a position intermediate said first and second connecting means, and further wherein the tilting lever is forked at its end facing the cover member, wherein said cover member includes a bracket mounted thereon which is movable in the space between fork legs formed by said tilting lever, said bracket being provided with locking pins displaceable against spring force, said locking pins forming the axis of rotation of the tilting lever on the cover member and fitting releasably in corresponding holes in the legs of the tilting lever, and wherein actuating levers are mounted on the locking pins between the legs of the tilting lever, said actuating levers being accessible only with cover member tilted and only from outside the vehicle.

* * * * *